Jan. 16, 1934. L. E. THOMPSON 1,943,496

IRRIGATION PIPE JOINT

Filed Jan. 2, 1932

Inventor
Lynden E. Thompson

By [signature]

Attorney

Patented Jan. 16, 1934

1,943,496

UNITED STATES PATENT OFFICE 1,943,496

IRRIGATION PIPE JOINT

Lynden E. Thompson, Lompoc, Calif., assignor to Margaret T. Thornton, Lompoc, Calif.

Application January 2, 1932. Serial No. 584,410

4 Claims. (Cl. 285—171)

This invention relates to and has for an object the provision of an improved type of joint for irrigation pipes by means of which a leakproof joint may be quickly made between adjacent sections of an irrigation pipe, and the sections as readily disconnected for the purpose of eliminating the necessity of threaded couplings, and capable of yielding sufficiently to provide a substantially flexible pipe line.

Other objects may appear as the description progresses.

In the accompanying drawing I have shown a preferred form of device subject to modification within the scope of the appended claims without departing from the spirit thereof. In said drawing, Fig. 1 is a plan view of two adjacent sections of irrigation pipe and a joint operatively connecting the same, and embodying my improvements.

Figure 1:
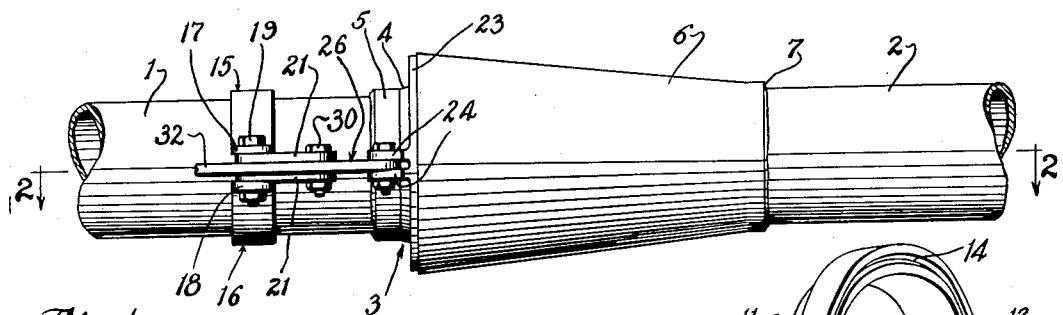
Figure 5:
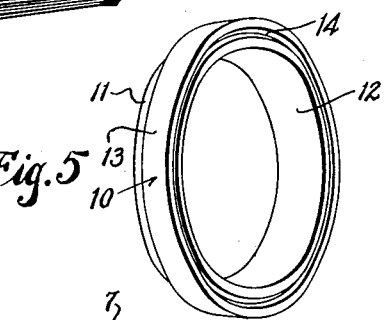
Fig. 5 is a perspective view of a suitable form of gasket employed for sealing the joint between two sections of pipe against leakage.

It will be understood in the consideration of this invention that irrigation pipe is only temporarily laid for use on the surface of the ground, and no attempt is made to align the pipe sections between the point of water supply and the point of distribution. The several pipe sections in a line are usually connected by unskilled persons, and it is desirable to provide a type of joint between the several sections which may be quickly manipulated for connecting or disconnecting the sections without the use of special tools.

To this end my improvements consist in the provision between a pair of adjacent irrigation pipe sections 1 and 2 of an improved type of joint 3 arranged to be quickly operated for connecting and disconnecting said sections. One end of each of the pipe sections is provided with a short outwardly flaring cone 4 which has a neck 5 overlying the pipe, as at 1, and preferably welded to said pipe. The other end of each section is provided with an outwardly flaring cone 6 substantially longer and of greater diameter at its outer end than the cone 4. The cone 6 encompasses the end portion of the pipe, as at 2, and is welded to the pipe at 7.

Figure 2:
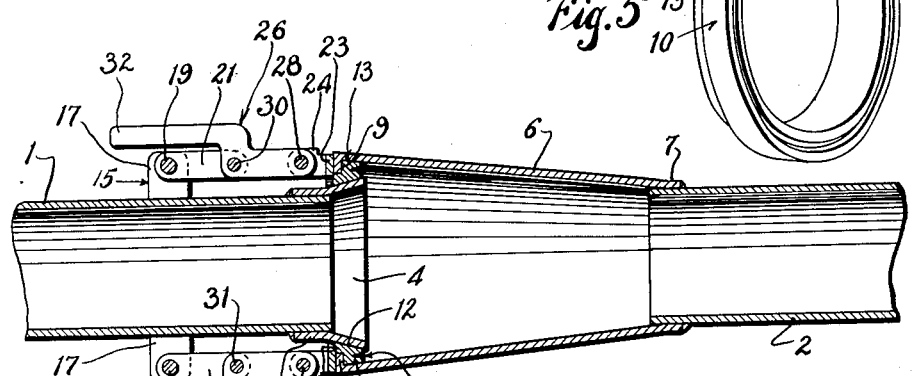
Fig. 2 is a sectional elevation of the same on line 2—2 of Fig. 1 with the joint closed.
Figure 3:
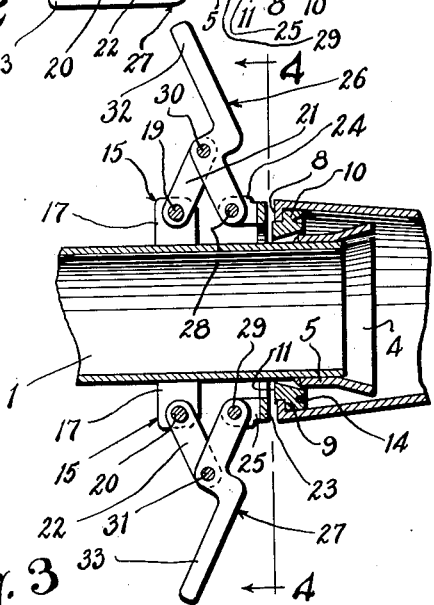
Fig. 3 is a fragmentary section of the joint in opened position.
Figure 4:
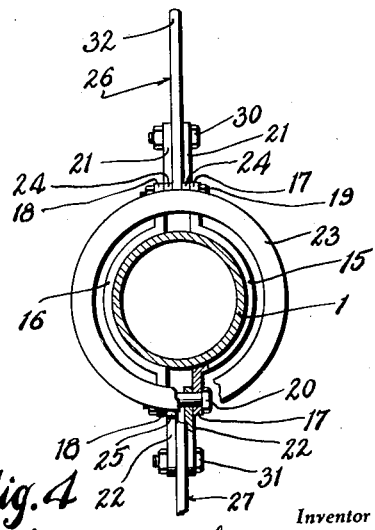
Fig. 4 is a sectional elevation of the joint on line 4—4 of Fig. 3.

The outer end of cone 6 is provided with an inwardly turned annular flange 8 providing a shoulder 9 inwardly of the cone against which an annular gasket 10 is adapted to seat, as shown in Figs. 2 and 3. Said gasket has a reduced portion 11 which extends thru the opening in the outer end of the cone 6 and a tapered aperture 12 therein adapted to fit the outer periphery of cone 4. Preferably the outer periphery 13 of gasket 10 fits the inner periphery of cone 6, and said gasket is formed with an annular groove 14 in its inner face intermediate the cones 4 and 6 so that as the joint is drawn tight by means hereinafter described the material of which the gasket is constructed may be compressed between the cones 4 and 6 so as to cause the inner and outer peripheries of the gasket to tightly engage said cone to provide a leakproof joint.

Each of the pipe sections, as at 1, is provided with a joint closing means including a pair of like members 15 and 16 which are bent to conform to and engage opposite sides of the pipe, and are secured thereto by welding, rivets, or otherwise. Members 15 and 16 are provided with spaced upwardly extended lugs 17, 17 and 18, 18 respectively which are cross connected by means of bolts 19 and 20. Links 21, 21 are hingedly mounted on the bolt 19 connecting lugs 17 and 18 and similar links 22, 22 are hingedly mounted on the bolts 20 connecting lugs 17 and 18 on the opposite side of the pipe.

A ring 23 is loosely mounted on the end of the pipe forwardly of the members 15 and 16 and is provided at diametrically opposite points with pairs of spaced lugs 24, 24 and 25, 25 alined with the links 21, 21 and 22, 22 respectively, longitudinally of the pipe. Operating handles 26 and 27 are hingedly connected respectively by means of bolts 28 and 29 to the lugs 24 and 25. Said handles are also connected by means of bolts 30 and 31 with the free ends of links 21 and 22 at points intermediate the ends of the handles, thus forming toggles for opening and closing the joint.

The members 26 and 27 are provided with off set portions 32 and 33 which provide handles for operating the toggles. Thus, as shown in Fig. 3, when the two adjacent sections 1 and 2 of a pipe are arranged in telescoping positions and the gasket 10 is inserted in the end of the cone 6, when the handles 26 and 27 are depressed the ring 23 will be moved to the right into engagement with the flange 8 of cone 6 and the cone 4 will be retracted into the position shown in Fig. 2, at which point it firmly engages the inner periphery of gasket 10 and provides a leakproof but slightly yieldable joint.

As shown in Fig. 2, when the handles 26 and 27 are completely depressed the toggle joints connecting members 15 and 16 with the ring 23 will be slightly over dead center so as to hold the sections 1 and 2 of the pipe operatively connected for the passage of water therethru. The handles 26 and 27 are quickly released for disconnecting the pipe sections by spreading the handles apart into the position shown in Fig. 3. The gaskets 10 are readily detachably from and insertable in the cone 6, and when they are to be inserted in position for use the gaskets are placed on the section as at 1 over the cone 4, and the cone 4 is then inserted into the cone 6 sufficiently to permit the gasket to be retracted into the position shown in Fig. 3. Thereafter the operating handles 26 and 27 are depressed for drawing the cone 4 into operative engagement with the gasket.

The arrangement shown lends itself readily to conditions obtaining on ranches where irrigation is necessary, especially where the contour of the ground is uneven, in that each of the joints will yield locally to provide a substantially flexible line of pipe.

In many cases it may not be necessary to lock the toggle operating means where the pressure is sufficient to force the cone 4 into sealing engagement with the gasket 10. Under such conditions, especially where the topography varies substantially, a maximum flexibility of a pipe line is provided when the toggles are unlocked.

However, the provision of the groove 14 in the gasket 10, together with the inherent resiliency of the material of which the gasket is made, permits a sufficient flexing of each of the pipe joints when the toggles are locked to serve for general purposes of irrigation under nearly all conditions.

What I claim is:

1. A pipe joint comprising in combination with a pair of pipes having outwardly flared conical end portions of reverse pitch telescoping one within the other, the outermost portion provided with an inwardly turned flange permitting the end of the adjacent section to be inserted therethru, a gasket held in said outermost portion against said flange for leakproof engagement with the flared portion of said other pipe, and toggle means secured to one of said pipes for engagement with the other pipe and operative for drawing said pipes into leakproof association.

2. A pipe joint comprising in combination a pair of pipes, one of said pipes having an elongated cone secured to an end thereof, a relatively short cone secured to the adjacent end of the other pipe, said shorter cone being of substantially less diameter than said other cone, and a resilient gasket held in the end of the larger cone for leakproof engagement with the smaller cone when pressure is applied to the pipe, and toggle means connecting said pipes for moving the cones into leakproof engagement with said gasket.

3. A pipe joint comprising a pair of pipes, reversely formed cones secured to the adjacent ends of said pipes for telescopic connection, the outer cone having an inwardly bent portion at its outer end, a resilient gasket held in said outer cone on said inwardly bent portion for engagement with the outer periphery of the inner cone to provide a leakproof joint between said pipes, and toggle means secured to one of said pipe sections for engagement with the other section to draw said pipes into leakproof engagement with said gasket when the toggles are locked.

4. A pipe joint comprising a pair of telescoping sections of pipe the outer section having an opening to receive the inner section, a gasket for sealing the joint between said sections, a lever pivotally connected to one of said sections, a link pivotally connecting said lever at a point intermediate its end with said other section, said lever and said link forming a toggle operative for drawing said sections into leakproof engagement when the toggle is adjusted to dead center position.

LYNDEN E. THOMPSON.